United States Patent [19]

Sharpe

[11] Patent Number: 4,910,586
[45] Date of Patent: Mar. 20, 1990

[54] HYBRID DPCM CODEC FOR COMPOSITE COLOR TELEVISION SIGNALS

[75] Inventor: Randall B. Sharpe, Chapel Hill, N.C.

[73] Assignee: Broadband Technologies, Inc., Morrisville, N.C.

[21] Appl. No.: 274,903

[22] Filed: Nov. 22, 1988

[51] Int. Cl.[4] ............................................. H04N 7/13
[52] U.S. Cl. ...................................... 358/13; 358/23; 358/133; 358/135
[58] Field of Search ...................... 358/12, 13, 23, 133, 358/135, 138, 141, 143

[56] References Cited

U.S. PATENT DOCUMENTS

| | | | |
|---|---|---|---|
| 4,663,660 | 5/1987 | Fedele | 358/133 |
| 4,843,467 | 6/1989 | Reimann | 358/135 |
| 4,849,758 | 7/1989 | Rosebrock | 358/13 |

Primary Examiner—Tommy P. Chin
Attorney, Agent, or Firm—Antonelli, Terry & Wands

[57] ABSTRACT

A composite color television signal codec combines modified folded, hybrid differential pulse code modulation (H-DPCM) encoding and band-limiting decimation and interpolation filters to enhance encoding resolution without a reduction in signal quality of the reconstructed signal. The codec encodes, at five bits per sample, an NTSC 4.2 MHz composite color video signal for transmission over a 44.736 Mb/s communication channel. As in a conventional (H-DPCM) encoding scheme, a digital code value that is associated with a previous (quantized) jth sample of the signal and the difference between that digital code value and a digital code value of an ith sample are combined to produce an output code value for the ith sample. However, unlike the conventional hybrid approach, in which the predictor for the ith value is the immediately previous sample, the present invention uses a jth sample located in the second previous line of the frame from the line in which the ith sample is located, and at a point that is both color phase-matched and aligned with the ith sample of interest. Because the 44.736 Mb/s data rate limitation of the communication link will not readily accommodate a 4.2 MHz NTSC signal that is represented by more than four bits per sample by a fixed rate encoder, the passband of an anti-aliasing, decimation filter is narrowed to 4.0 MHz, which does not effectively impair the quality of the reconstructed video at the receiver.

26 Claims, 6 Drawing Sheets

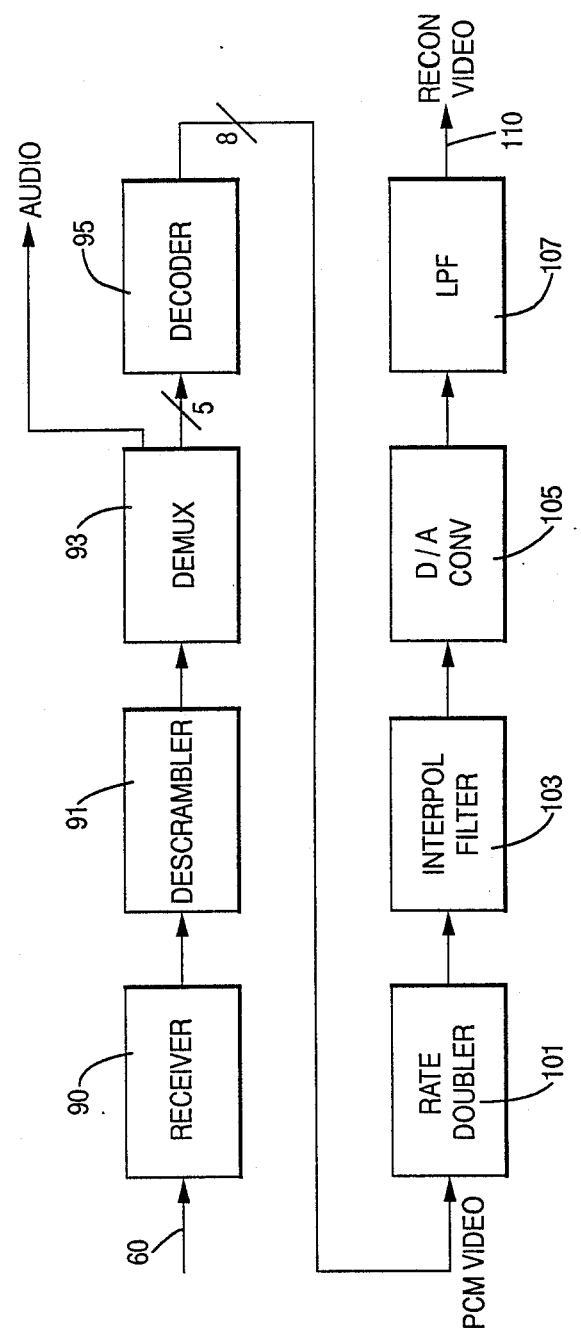

HYBRID DPCM CODEC FOR COMPOSITE COLOR TELEVISION SIGNALS

FIELD OF THE INVENTION

The present invention relates in general to communication systems and is particularly directed to a new and improved bandwidth-limited system for encoding, transmitting and reconstructing NTSC composite color television signals using a high resolution, hybrid differential pulse code modulation encoding mechanism.

BACKGROUND OF THE INVENTION

The transmission of color television signals (e.g. NTSC signals) over standard communication channels of the North American hierarchy, e.g. DS3 or 45 Mb/s, is currently accomplished using some form of digital encoding mechanism through which the signal of interest is digitized and encoded (including data compression) for transmission to a receiver site. At the receiver site, the encoded signal is decoded (expanded) and converted into the analog format of the original signal, thereby deriving a 'reconstructed' version of the original video signal. Because the nominal 4.2 MHz bandwidth of composite NTSC color signals is an industry standard, nonvariable quantity, and given the fact that the digital encoding mechanism must adhere to the Nyquist criteria of band limiting the sampled signal to no more than half the sampling frequency (which, in the case of NTSC signals, must be at least 8.4 MHz) and taking into account the additional communication overhead bits that are included in a frame of data, and the available transmission capacity of a DS3 facility being 44.736 Mb/s, then it can be seen that the encoding resolution is typically limited to no more than four bits per sample for codes employing a fixed number of bits per encoded sample. Moreover, the choice of a four bit resolution encoding scheme is underscored by the fact that it permits the use of a sampling clock that is compatible with the format of NTSC color signals and permits easily realizable antialiasing and reconstruction filters. Because of the limitation of sixteen code words for four bits per sample encoding schemes, typical four bit encoders must compromise either the signal-to-noise ratio or the fidelity of difficult to encode objects, such as edges.

SUMMARY OF THE INVENTION

In accordance with the present invention, there is provided a new and improved composite color television signal encoding/decoding mechanism (codec) that combines a folded, hybrid differential pulse code modulation encoding technique and a band-limiting filter mechanism which enable the encoding resolution to be significantly enhanced, without a reduction in signal quality (due to the band-limiting action). More particularly, the present invention provides a scheme for digitally encoding a composite 4.2 MHz NTSC color television signal for transmission over a 44.736 Mb/s digital communication link at a five bits per sample encoding resolution which, because of the symmetry of the folded, hybrid differential pulse code modulation used in the encoding process, effectively yields an encoding resolution of six bits per sample, thus considerably enhancing the performance of the system.

Pursuant to the present invention, a modified version of a hybrid differential pulse code modulation (DPCM) mechanism is employed to encode a quantized composite color television signal to the above-referenced five/six bit accuracy. As in a conventional hybrid (DPCM) encoding scheme, a code value that is associated with a predictor nth sample of the signal and the difference between that code value and a code value of an ith sample to be encoded are combined (summed) to produce an output code value for the ith sample. In accordance with the conventional hybrid approach, the predictor jth sample is the immediately previous sample. However, in the case of an NTSC composite color signal and with a modification (reduction, to meet time-bandwidth product requirements) of the sampling clock frequency for achieving the desired increase in codeword size (greater than four bits per sample), choosing the immediately preceding sample as the jth sample is not useful.

More specifically, because the signal to be encoded is a composite color signal, it is necessary that the prediction reference, i.e. a previous jth sample, for the ith sample of interest have a color subcarrier phase that effectively corresponds to, or matches, the color subcarrier phase of the ith sample. For a composite color television signal the immediately preceding sample is not so matched. Consequently, a direct application of a hybrid DPCM encoding mechanism to a composite color television signal will not produce a useful signal.

To obviate this shortcoming, the present invention employs a modified form of a hybrid DPCM encoder in which the predictor jth sample is not in the same line of the frame, but is still sufficiently close to the ith sample of interest, satisfying the color subcarrier phase matching requirement, and is derivable from the reduced frequency sampling clock. In accordance with a preferred embodiment of the invention, the predictor jth sample is located in the second previous line of the frame from the line in which the ith sample is located, and at a point that is vertically aligned with the ith sample of interest, and derivable from the sampling clock.

Now, even though the modified hybrid DPCM encoding mechanism solves the problem of color phase match with increased encoding resolution, there still remains the fact that the 44.736 Mb/s data rate limitation of the communication link will not readily accommodate a 4.2 MHz NTSC signal that is sampled at a rate greater than the Nyquist minimum (8.4 Mb/s) and is quantized to more than four bits per sample. Pursuant to the present invention this limitation is obviated by the use of a band-limiting antialiasing, decimation filter which effectively reduces the composite TV input signal bandwidth from 4.2 to 4.0 MHz sharply without introducing group delay variations and thus allows the successful transmission of the (five bit resolution) encoded signal over the 45 Mb/s link. Preferably, the decimation filter has a raised cosine cut-off characteristic to reduce ringing and simplify the realization of the filter.

At the receiver site, the received signal is demultiplexed into respective encoded video and audio portions and respective digital output codes associated with the encoded video samples are extracted. Through a reconstruction decoder, the contents of each digital output code are decoded and converted into an analog bandwidth-limited color television signal. Like the encoding mechanism at the transmitter site, the reconstruction decoder operates on (decodes) the contents of the encoded data in accordance with a hybrid differential pulse code modulation mechanism to obtain a digital code value for a respective ith sample value. A low-pass digital interpolation filter is coupled between the decoder and a digital-analog converter from which the reconstructed analog composite color video signal is derived.

BRIEF DESCRIPTION OF THE DRAWINGS

FIG. 7 is a schematic block diagram of a receiver and video reconstruction unit.

DETAILED DESCRIPTION

Figure 1:
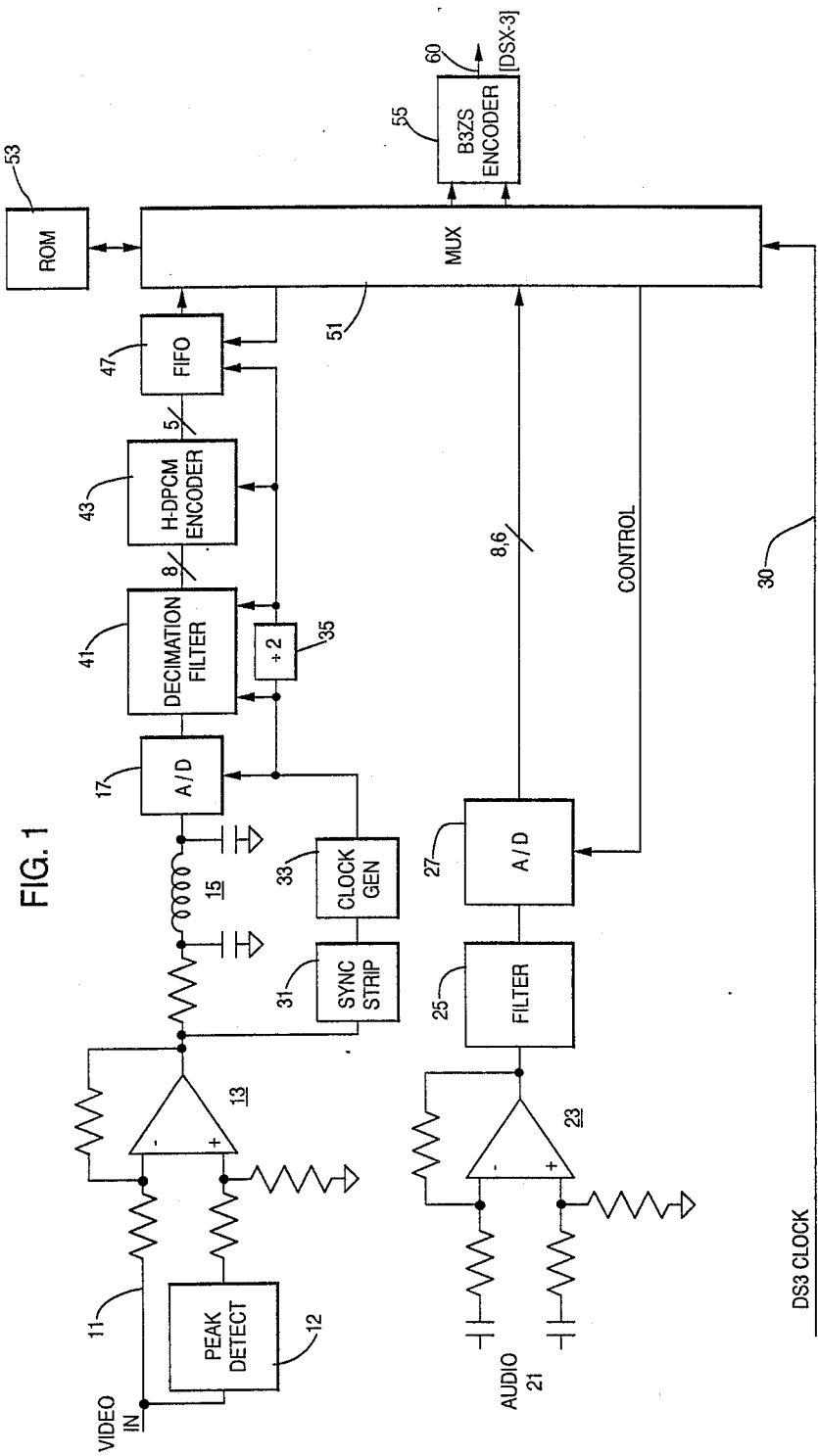
FIG. 1 is a schematic block diagram of the (encoding) transmit end of a composite color television signal transmission system in accordance with the present invention.

Before describing in detail the particular improved composite color television signal encoding/decoding mechanism (codec) in accordance with the present invention, it should be observed that the present invention resides primarily in a novel structural combination of conventional communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring now to FIG. 1, a schematic block diagram of the (encoding) transmit end of the composite color television signal transmission system in accordance with the present invention is shown as comprising a video input port 11 to which a composite (NTSC) color video signal is applied. The system may also include one or more audio ports 21 to which separate audio channel signals to be combined with the video signal for transmission over a digital communication link (e.g. DSX-3) to a receiver site are applied. Input port 11 is coupled to a peak detector 12 and a difference amplifier 13, to which the output of the peak detector 12 is also coupled. Peak detector 12 tracks the peaks or tips of the synchronization pulses within the NTSC composite signal. Its output is low-pass filtered to pass 60 Hz signals. Within difference amplifier 13, the low frequency signal passed through peak detector 12 is subtracted from the video input signal on link 11 to produce a DC restored and hum free video signal at the output of amplifier 13. The output of amplifier 13 is a clamped video signal which is applied to a composite synchronization pulse extractor made-up of a sync strip circuit 31 and a clock generator 33 and to a low-pass filter 15. Low-pass filter 15 may comprise a simple three-pole, 13.6 MHz low-pass filter the output of which is coupled to the sampling input of an analog-to-digital converter 17. Sync stripper circuit 31 includes an amplifier which buffers the synchronization signal from the main video path and band-limits the signal to 2 MHz to prevent noise spikes from generating false sync pulses. Sync stripper 31 derives horizontal sync pulses from the composite sync pulses and employs these horizontal sync pulses to generate a video sampling clock by way of clock generator 33. For a typical horizontal line rate (15.734 MHz), the sampling clock may be on the order of 1,100 (1092) times the horizontal line rate, which will satisfy the requirements of a spacially fixed sampling pattern.

Figure 2:
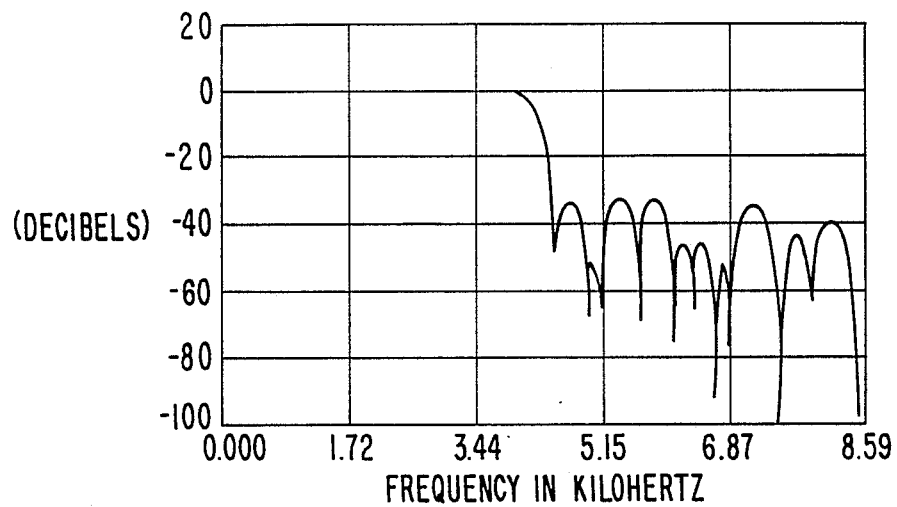
FIG. 2 shows the frequency passband characteristic of band-limiting decimation filter 41 of the encoder, transmission system of FIG. 1 and interpolation filter 103 of the receiver, reconstruction system of FIG. 7.

Analog-to-digital converter 17 quantizes the clamped video signal supplied through filter 15 to eight bits per sample, clocked at the 17.1818 MHz rate supplied by clock generator 33. The output of analog-to-digital converter 17 is applied to a band-limiting decimation filter 41 (the frequency passband characteristic of which is shown in FIG. 2), which band-limits the signal to 4.3 MHz. The band-limited signal produced by decimation filter 41 may be represented by a sampling frequency of 8.5909 Megasamples per second (half the clock rate produced by clock generator 33) so that a divide-by-two circuit 35 is coupled in the clock circuit path, which effectively blanks out or discards alternate samples of the quantized signal. Consequently, the output of decimation filter 41 is effectively an eight bit 8.5909 Megasamples/second PCM video signal. The output of divider 35 is also employed to clock a hybrid differential pulse code modulation encoder 43 and a first-in, first-out, buffer 47.

The output of buffer 47 is coupled as one input to a multiplexer 51. One or more additional encoded audio inputs to multiplexer 51 are derived through audio channels 21. Each audio channel 21 is coupled through a difference amplifier 23, the output of which is band-limited to approximately 15 kHz by way of a filter 25 and then sampled every 26.6 microseconds to provide a quantized audio signal on the order of thirteen bits per sample. A fourteenth, parity, bit is derived by analog-to-digital converter 27 on the basis of the most significant eight bits of the audio signal and coupled with the 13 quantization bits to multiplexer 51.

Each audio sample from audio channel 21 is controllably interleaved with the encoded video signals output through buffer 47 under the control of a suitable multiplexing control code stored in a read only memory 53, and output under the control of a communication link clock (e.g. DS3 clock) on line 30. The output of multiplexer 51 is coupled to a scrambling encoder 55, such as a conventional modulo-two adder, shift register polynomial encoder and output on digital communication link (e.g. a DSX-3 data link) 60.

As pointed out previously, significant aspects of the present invention are the modified form of the hybrid DPCM encoder 43 and the use of a band-limiting decimation filter in conjunction with the hybrid DPCM encoder to achieve an effective compression of the video signal bandwidth and thereby enable a higher resolution encoded signal to be placed on the 45 Mb/s channel 60. In order to appreciate the functionality and performance characteristics of decimation filter 41, it is initially useful to examine the parameters of the sampling mechanism.

In a video signal encoder, the picture is effectively sampled horizontally in a line-by-line fashion, so that a two dimensional sample array is produced. The sampling or quantizing of instantaneous values of the television signal is carried out to a particular bit resolution. The higher the number of bits, the greater the signal-to-noise ratio of the reconstructed picture. Typically, a 60 dB-weighted signal-to-noise ratio can be achieved using an 8-bit quantizer.

Conventional (Nyquist-based) sampling criteria require that the sampled signal be band-limited to no more than half the sampling frequency plus five to fifteen percent more to be realizable. Since the nominal NTSC video bandwidth is 4.2 MHz, it follows that a practical sampling frequency must be greater than 9.0 MHz. In addition, if the sampling pattern is not spacially fixed, quantizing errors will produce visible movable artifacts. The sampling frequency, which is a multiple of the line rate of the TV frame, will produce a spacially fixed sampling pattern. As pointed out above, clock generator 33 and divider 35 operate to produce a sampling rate of 8.5909 MHz, which is 546 times the line rate of the NTSC signal and is 12/5 times the frequency of the 3.58 MHz color burst subcarrier of the NTSC composite video signal.

In any video signal digital processing system, a number of factors which govern the characteristics of the anti-aliasing filter include the highest possible end-of-pass band frequency, lowest possible pass band ripple, largest possible stop-band attenuation, smallest variation in group delay, lowest step-response ringing and minimum complexity. Proper choice of the characteristics of the anti-aliasing filter include trade-offs among the selections of the importance of the various factors.

One mechanism for successfully implementing an anti-aliasing filter is a technique known as decimation, through which the analog signal is band-limited sampled and then digitally low-pass filtered, with alternate samples being derived at the output of the decimation filter.

In accordance with the present invention, such a decimation filter is employed to band-limit the video signal to prevent aliasing. Specifically, decimation filter 41 is comprised of a half-bank filter having a raised cosine cut-off characteristic as shown in FIG. 2. Decimation filter 41 is preferably a 47th order FIR symmetrical filter having a passband up to 4.0 MHz.

The anti-aliasing decimation filter function is carried out in accordance with the present invention by setting the parameters of low-pass filter 15, analog-to-digital converter 17 and decimation filter 41. Specifically, low-pass filter 15 band-limits the input video signal to twice the nominal sampling frequency less the signal bandwidth. As noted above, since the nominal frequency of the composite NTSC color video signal is 4.2 MHz, it must be sampled at a sampling frequency $f_s$ of at least 8.6 MHz. Twice this nominal sampling frequency ($2f_s$) less the signal bandwidth yields a frequency on the order of 13 MHz, or approximately the passband of low-pass filter 15. Clock generator 33 produces a clock frequency at 17.1818 MHz, namely at twice the sampling frequency $f_s=8.5909M$ samples/sec. As can be seen from FIG. 2, the filter characteristic of raised cosine decimation filter 41 effectively digitally low-passes the sampled signal at 4.0 MHz, which is slightly less than the nominal NTSC bandwidth of 4.2 MHz. However, because of the significant performance advantage obtained by the increased resolution of the hybrid DPCM encoder, this minor loss of 200 kHz in signal bandwidth is not only tolerable, but turns out to be substantially negligible in terms of the quality of the output signal obtained. Divider 35 produces a divided sampling frequency of 8.5909 MHz which alternately switches the outputs of the half bank filters of which decimation filter 41 is comprised, so that alternate samples of the quantized signal are coupled to encoder 43, band-limited by a decimation filter 41 with a cut-off frequency of 4.0 MHz.

As described briefly above, the encoding mechanism employed in accordance with the present invention is a modified hybrid digital pulse code modulation (H-DPCM) encoding mechanism, employing a folded quantizer. In the present description, the term hybrid DPCM is used in the same context as described in the literature, specifically in an article entitled "Hybrid D-PCM, A Combination of PCM and DPCM" by M. C. W. Van Buul, IEEE Trans. Commun., Vol. COM-26 (1978) No. 3, pp. 362–368 and employing a symmetrical folded quantizer as described in an article by G. Bostelman entitled "A Simple High Quality DPCM-Codec Video Telepathy Using 8M Bit Per Second", Nachrichtentechn. Z. Vol. 27 (1974) pp. 115–117, specifically itemized with reference to the FIG. 10 characteristic of the Van Buul article.

To facilitate an understanding of the modification of the hybrid DPCM encoder, the basic compression algorithm described in detail in the Van Buul article will be briefly reviewed below with reference to FIG. 3. For more specifics, attention may be directed to the article itself.

The motivation of a hybrid DPCM encoding mechanism is to combine the bit-rate reduction properties of DPCM and the fast error recovery property of PCM encoding. FIG. 3 shows a sequence of samples S1, S2 . . . S6, each of which contains a fixed scale FS and a sliding scale DS for defining the amplitude of the sample and the difference between the amplitude of the sample and a previous sample. For coding the sample, the amplitude is measured with the fixed scale FS and as in PCM encoding. The difference between the true sample and its prediction is measured with the sliding scale DS as in DPCM. The actual prediction value $N_f$ and the difference value $N_d$ are summed to yield a hybrid DPCM code number $N_h$. The prediction employed for each sample is the previous 'reconstructed' sample value.

Figure 3:
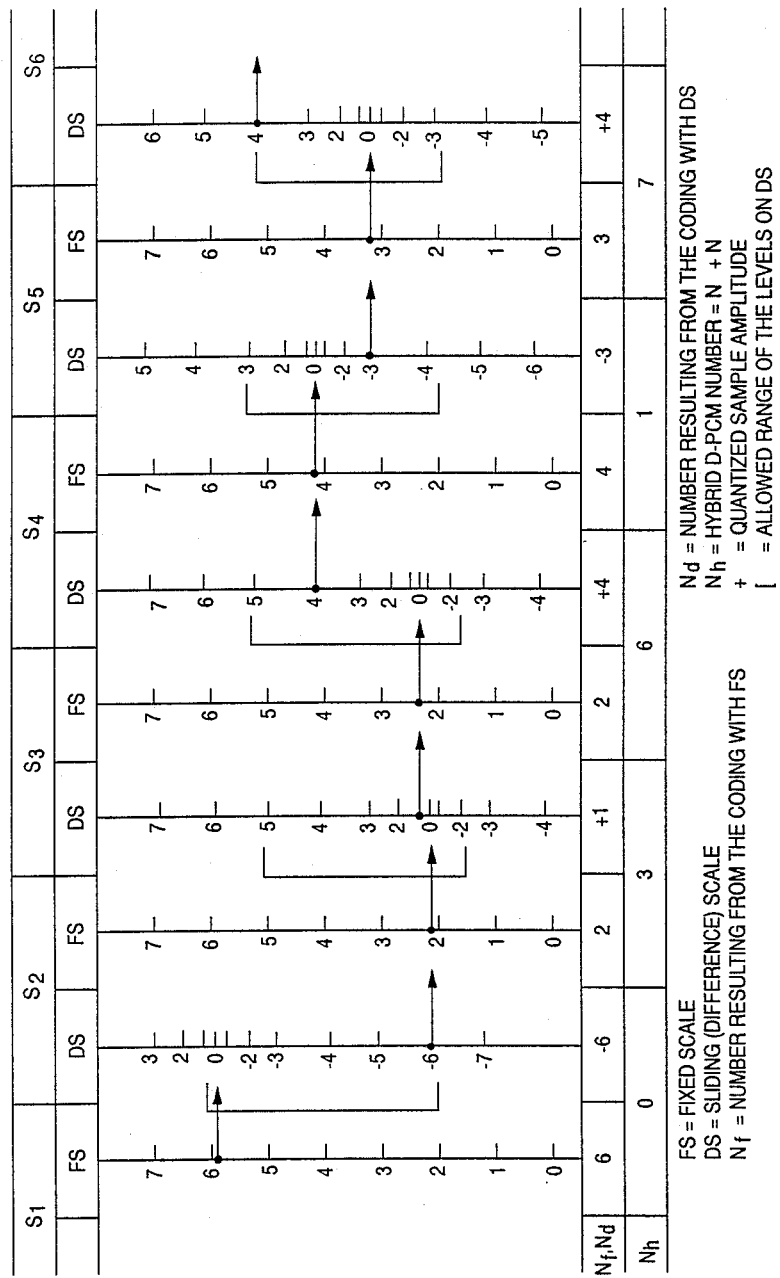
FIG. 3 illustrates the operation of a hybrid DPCM encoding mechanism.

In the example shown in FIG. 3, the difference scale has a range of 15 values, numbered from $-7$ to $+7$ (including 0). Consequently, the H-DPCM number $N_h$ ($=N_f+N_d$) may have a range of from $-7$ to $+14$. For the purposes of coding a sample value, there is an additional restriction in that only eight levels of the difference scale may be used, resulting in a number between 0 and 7. This provides an adaptation of the difference signal to the amplitude of the input signal. The effect is similar to that obtained with a switched quantizer.

In the example shown in FIG. 3, the initial sample $S_1$ has a fixed scale value of 6. The next subsequent sample $S_2$ has an amplitude of 2. Using the sliding scale DS, the 0 point of the sliding scale is aligned with the value of the previous sample FS of sample $S_1$ and then the point on the sliding difference scale which is aligned with the sample value of the subsequent sample is read. Thus, as shown in FIG. 3, for the second sample $S_2$, the difference between the actual value and the prediction, as measured by the difference scale DS, is found to be $-6$. Adding the two numbers $N_f = +6$ and $N_d = -6$ yields a hybrid DPCM number of $6-6=0$.

For the next sample $S_3$, with the 0 point of its sliding scale DS aligned with the sample value on the fixed scale of the previous sample $S_2$, the difference between the actual sample and the fixed scale is measured and found to be $+1$. Summing the two numbers $N_f = +2$ and $N_d = +1$ yields a hybrid DPCM number for the third sample $S_3$ as $N_h = +2+1 = +3$. Subsequent encoded values, not described here, are itemized in detail in FIG. 3.

Decoding the sample values from the hybrid DPCM number Nh is a fairly straightforward exercise. The received hybrid DPCM number Nh is subtracted from the quantized prediction number Nf, in order to derive the difference scale number Nd. As in a conventional DPCM decoder, the difference number is summed with the prediction value to produce a reconstructed sample value. The reconstructed sample values are then used to obtain the prediction for subsequent samples.

Figure 4:
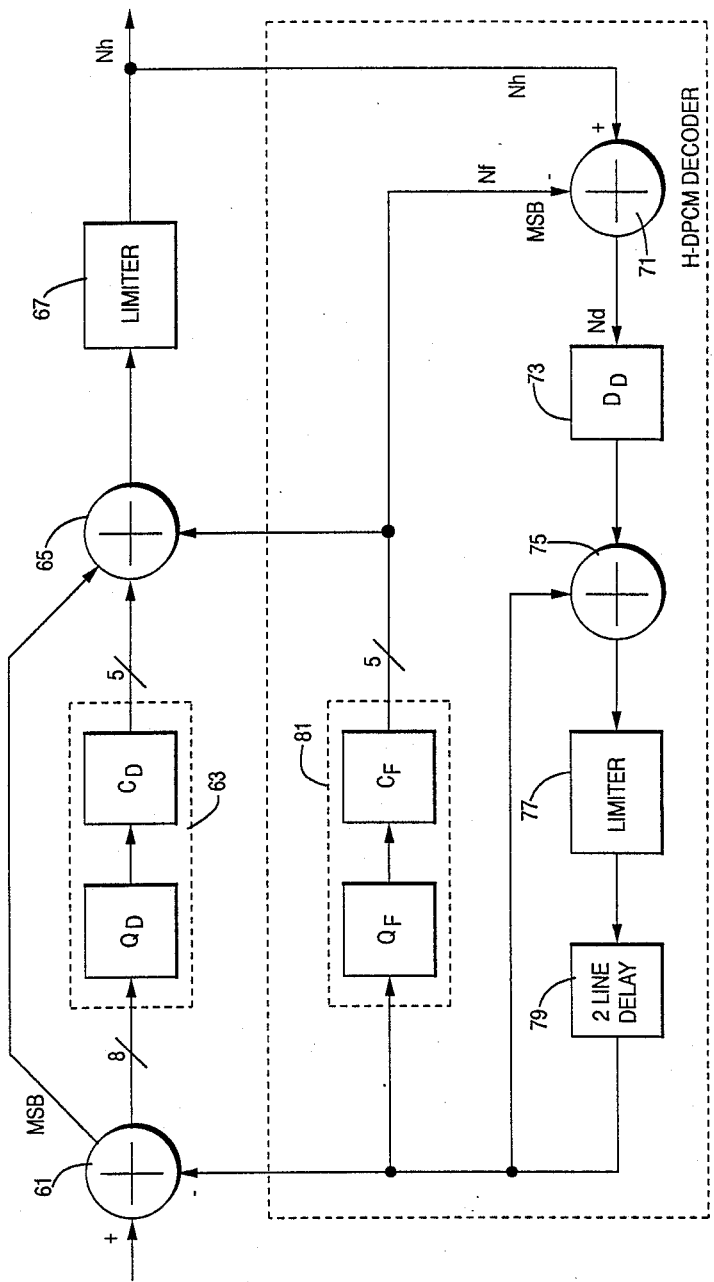
FIG. 4 is a block diagram of a modified hybrid DPCM encoder in accordance with the present invention.

Referring now to FIG. 4, there is illustrated a block diagram of a modified hybrid DPCM encoder in accordance with the present invention. As noted previously, the encoder in accordance with the present invention is modified with respect to the conventional hybrid DPCM encoder as described in the above referenced Van Buul article in that prediction values are not based upon the immediately preceding sample and the fact that five-bit encoding is employed.

More particularly, the eight bit quantized sample code at the output of decimation filter 41 is coupled to a subtractor 61. The eight bit code is then quantized to five bits in code compression, sliding scale quantizer 63, the output of which is coupled to one input of an adder 65. The most significant bit of the eight bit code supplied from subtractor adder 61 is also coupled to adder 65. The most significant bit is employed as a sign bit. The output of adder 65 is coupled through a limiter 67 to output buffer 47 and to one input of a subtractor 71 within a decoder 70. Decoder 70 is used to reconstruct the prediction sample for the encoding process. Subtractor 71 subtracts the fixed scale prediction value $N_f$ at its negative input port from the hybrid value $N_h$ at its positive input port and produces the difference value $N_d$, which is referenced through a scaler 73 and applied as one input to an adder 75. The output of adder 75 is coupled through limiter 77 and delay 79, which subjects the sample to a two line delay, so that the prediction value employed is derived from the previous second line and in time alignment with the sample of interest. The output of delay 79 is coupled as a second input to adder 75, to the difference input of subtractor 61 and to a fixed scale quantizer 81 which, like quantizer/scaler 63, effectively quantizes the eight bit code to five bits. The output of encoding scaler 81 is coupled to adder 65 and subtractor 71.

Figure 5:
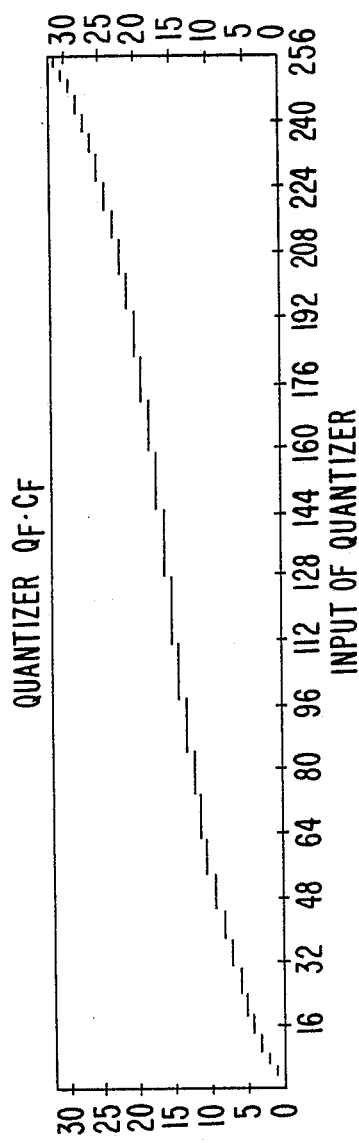
FIGS. 5 and 6 show quantized bit error characteristics for five bit and folded five bit H-DPCM encoding.
Figure 6:
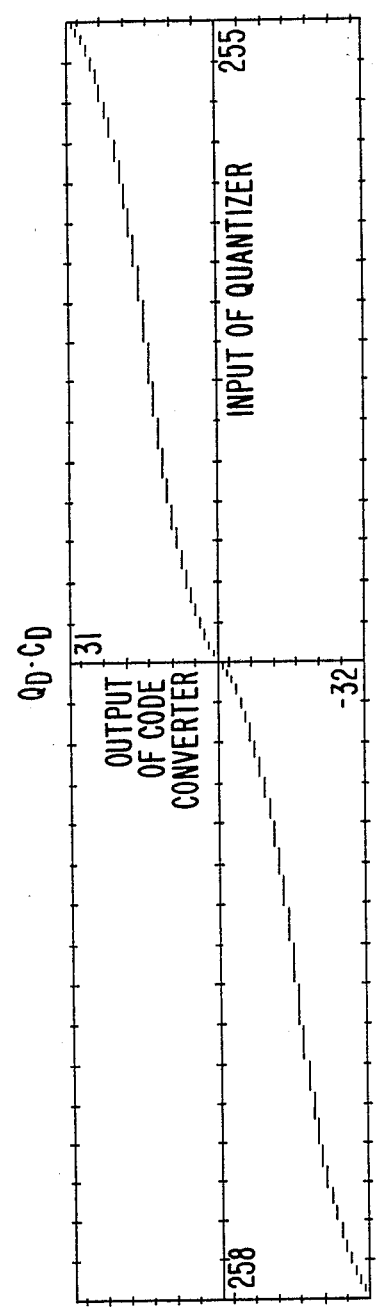

FIGS. 5 and 6 show the relationships between the quantized prediction error and prediction errors for fixed scale quantizer 81 and sliding scale quantizer 63 within the hybrid DPCM encoder shown in FIG. 4. As shown in FIG. 5, because of the additional or fifth bit, the code resolution of the quantizer is effectively doubled with respect to a conventional four bit scheme and, of particular significance is the fact that the code resolution is not compressed or bunched around the lower end of the scale, sacrificing overloading for acceptable granularity.

In addition, because of the folding symmetry of the quantization characteristic, shown in FIG. 6, it is possible to shift both the first and third quadrants characteristics into the first quadrant and thereby double the five bit resolution to six bits, realizing, of course, that the sign bit is employed to delineate the quadrant.

Referring now to FIG. 7, a schematic block diagram of the receiver/reconstruction unit employed at the receiver site, down link of communication channel 60, is shown as comprising a receiver 90, the input of which is coupled to communication link 60 and the output of which is coupled to a descrambler 91. Descrambler 91 is complementary to the line encoder scrambler 55 at the transmit end, employing a conventional modulo-two adder, shift register polynomial circuit interconnected to execute a prescribed multi-bit polynomial.

The output of descrambler 91 is coupled to a demultiplexer 93, which separates the audio and compressed video signals from the respective frames of data and forwards the compressed video signals to a decoder 95.

Decoder 95 is configured identically to the decoder 70 within the H-DPCM encoder 43 at the transmit end, shown in detail in FIG. 4, described above. Consequently, decoder 95 produces an eight bit decompressed signal which is to be converted from PCM to band-limited analog format.

For this purpose, the output of decoder 95 is coupled to a rate doubler circuit 101 which doubles the data rate by inserting zero-valued samples between the successive sample codes derived at the output of decoder 95. The resulting bit stream is then supplied to a low-pass digital interpolation filter 103 which effectively corresponds to the decimation filter 41 within the encoding unit. The filter coefficients are selected so as to remove images of the sampled video signal that are centered around odd multiples of the sampling frequency.

The output of interpolation filter 103 is coupled to digital-to-analog converter 105 which converts the filtered sampled values to analog form. The energy within the resultant analog signal will be confined to multiples of a 17.2 MHz conversion frequency which is removed through the use of a downstream low-pass filter 107, from which the reconstructed output analog color video signal is derived on reconstructed video output link 110.

Interpolation filter 103 is preferably a 47th order FIR half-band low-pass filter, which provides a constant delay, so that the color information is not displaced in time from the luminance information on the carrier. The amplitude response of interpolation filter 103 effectively matches that of decimation filter 41 (FIG. 2) employed in the encoder unit at the transmitter site. The stop band attenuation of the filter removes spectral images of the decompressed PCM signal, the largest components of which are approximately 8.6 MHz and 8.6–3.58 MHz (the image of the color subcarrier). Interpolation filter 103 is symmetric about 8.6 MHz. The filter has a zero-response at 8.6 MHz, substantial attenuation (50 dB) at the color subcarrier image (3.58 MHz) and substantial attenuation (at least 32 dB) for frequencies between 4.6 MHz and 8.6 MHz.

As will be appreciated from the foregoing description, by combining folded, hybrid differential pulse code modulation encoding and a band-limiting filter mechanism, the present invention is able to achieve an encoding resolution and reconstructed signal quality that is significantly enhanced over conventional four-bit resolution schemes. As a consequence, the invention offers an effective mechanism for digitally encoding a composite NTSC color television signal for transmission over a 45 Mb/s communication channel at a five bits per sample encoding resolution which, because of the symmetry of the folded, hybrid differential pulse code modulation used in the encoding process, effectively yields an encoding resolution of six bits per sample, thus considerably enhancing the performance of the system.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. An apparatus for digitally encoding a color television signal for transmission over a digital communication link at a prescribed data transmission rate comprising:
   quantizer/filter means, coupled to receive said color television signal, for sequentially sampling said color television signal at a sampling rate that effectively corresponds to at least twice the bandwidth of said color television signal and at a rate producing a spatially fixed sampling pattern and generating a digital code signal representative thereof the frequency content of which is effectively limited to less than the bandwidth of said color television signal; and
   code compression means, coupled to receive the filtered digital code signal generated by said quantizer/filter means, for compressing said digital code signal by means of a hybrid differential pulse code modulation mechanism in which a digital code value associated with a previous jth sample of said color television signal and the difference between the digital code value associated with said previous jth sample and the digital code value of an ith sample of said color television signal are combined to produce a digital output code value for said ith sample, said previous jth sample having a color subcarrier phase that effectively corresponds to the color subcarrier phase of said ith sample, and wherein the number of bits of which said digital output code is comprised is an integral value approximating the ratio of said data transmission rate to said sample rate.

2. An apparatus according to claim 1, wherein said quantizer/filter means comprises means for quantizing said color television signal at a sampling rate that effectively corresponds to four times the bandwidth of said color television signal and at a rate producing a spatially fixed sampling pattern and generating digital code signals representative thereof, and decimation filter means, having a passband frequency less than the bandwidth of said color television signal, for filtering said generated digital code signals, and means for coupling alternate filtered digital code signals to said code compression means.

3. An apparatus according to claim 1, wherein said color television signal comprises an NTSC composite color television signal having a nominal video bandwidth of 4.2 MHz., said prescribed data transmission rate corresponds to 44.736 Mb/s and wherein said digital output code comprises a five bit digital output code.

4. An apparatus according to claim 3, wherein said quantizer/filter means includes means for effectively limiting the frequency content of said generated digital code signal to a frequency passband on the order of 4.0 MHz.

5. An apparatus according to claim 1, wherein said previous jth sample corresponds to a sample occurring in the second previous line of the same field of said color television signal.

6. An apparatus according to claim 5, wherein said color television signal comprises an NTSC composite color television signal having a nominal video bandwidth of 4.2 MHz., said prescribed data transmission rate corresponds to 44.736 Mb/s and wherein said digital output code comprises a five bit digital output code, and wherein said quantizer/filter means includes a passband filter having passband frequency on the order of 4.0 MHz.

7. An apparatus according to claim 1, wherein the digital code associated with said previous jth sample of said color television signal corresponds to a decoded value of a digital output code value for said previous jth sample.

8. An apparatus according to claim 1, wherein said hybrid differential pulse code modulation mechanism comprises means for summing the digital code value associated with a previous jth sample of said color television signal with the difference between the digital code value associated with said previous jth sample and the digital code value of an ith sample of said color television signal to produce said digital output code value for said ith sample.

9. A color television signal communication system comprising:
   at a transmission site,
   an arrangement for digitally encoding a color television signal for transmission over a digital communication link at a prescribed data transmission rate, said arrangement including
   quantizer/filter means, coupled to receive said color television signal, for sequentially sampling said color television signal at a sampling rate that effectively corresponds to at least twice the bandwidth of said color television signal and at a rate producing a spatially fixed sampling pattern and generating a digital code signal representative thereof, the frequency content of which is effectively limited to less than the bandwidth of said color television signal; and
   code compression means, coupled to receive the digital code signal generated by said quantizer/filter means, for compressing said digital code signal by means of a hybrid differential pulse code modulation mechanism in which a digital code value associated with a previous jth sample of said color television signal and the difference between the digital code value associated with said previous jth sample and the digital code value of an ith sample of said color television signal are combined to produce a digital output code value for said ith sample, said previous jth sample having a color subcarrier phase that effectively corresponds to the color subcarrier phase of said ith sample, and wherein the number of bits of which said digital output code is comprised is an integral value approximating the ratio of said data transmission rate to said sample rate; and means for controllably combining the digital output code produced by said code compression means with at least one additional digital code representative of audio signals and transmitting the resultant combined code to a receiver site over said digital communication link.

10. A color television signal communication system according to claim 9, wherein said quantizer/filter means comprises means for quantizing said color television signal at a sampling rate that effectively corresponds to four times the bandwidth of said color television signal and at a rate producing a spatially fixed sampling pattern and generating digital code signals representative thereof, and decimation filter means, having a passband frequency less than the bandwidth of said color television signal, for filtering said generated digital code signals, and means for coupling alternate filtered digital code signals to said code compression means.

11. A color television signal communication system according to claim 9, further comprising:
at a receiver site,
means for receiving the resultant combined code that has been transmitted from said transmitter site over said digital communication link and controllably separating said digital output code from said resultant combined code; and
reconstruction means, coupled to said receiving means, for decoding the contents of said digital output code and reconstructing therefrom said bandwidth-limited color television signal.

12. A color television signal communication system according to claim 11, wherein said reconstruction means comprises decoder means for decoding the contents of said digital output code in accordance with said hybrid differential pulse code modulation mechanism to obtain a digital code value for said ith sample value, a low-pass digital interpolation filter coupled to the output of said decoder means for filtering said digital code value, and a digital-analog converter coupled to the output of said interpolation filter for deriving an analog signal representative of the ith sample value of said color television signal.

13. A color television signal communication system according to claim 12, wherein said color television signal comprises an NTSC composite color television signal having a nominal video bandwidth of 4.2 MHz., said prescribed data transmission rate corresponds to 44.736 Mb/s and wherein said digital output code comprises a five bit digital output code.

14. A color television signal communication system according to claim 13, wherein said quantizer/filter means includes means for effectively limiting the frequency content of said generated digital code signal to a frequency passband on the order of 4.0 MHz.

15. A color television signal communication system according to claim 12, wherein said previous jth sample corresponds to a sample occurring in the second previous line of the same field of said color television signal.

16. A color television signal communication system according to claim 15, wherein said color television signal comprises an NTSC composite color television signal having a nominal video bandwidth of 4.2 MHz., said prescribed data transmission rate corresponds to 44.736 Mb/s and wherein said digital output code comprises a five bit digital output code, and wherein said quantizer/filter means includes a passband filter having a passband frequency on the order of 4.0 MHz.

17. A color television signal communication system according to claim 9, wherein the digital code associated with said previous jth sample of said color television signal corresponds to a decoded value of a digital output code value for said previous jth sample.

18. A color television signal communication system according to claim 9, wherein said hybrid differential pulse code modulation mechanism comprises means for summing the digital code value associated with a previous jth sample of said color television signal with the difference between the digital code value associated with said previous jth sample and the digital code value of an ith sample of said color television signal to produce said digital output code value for said ith sample.

19. A method of encoding a color television signal for transmission over a limited bandwidth digital communication channel comprising the steps of:
(a) coupling said color television signal to a quantizer/filtering mechanism which sequentially samples color television signal at a sampling rate that effectively corresponds to at least twice the bandwidth of said color television signal and at a rate producing a spatially fixed sampling pattern and generating a digital code signal representative thereof, the frequency content of which is effectively limited to less than the bandwidth of said color television signal; and
(b) compressing the digital code signal generated in step (a) by means of a hybrid differential pulse code modulation mechanism in which a digital code value associated with a previous jth sample of said color television signal and the difference between the digital code value associated with said previous jth sample and the digital code value of an ith sample of said color television signal are combined to produce a digital output code value for said ith sample, said previous jth sample having a color subcarrier phase that effectively corresponds to the color subcarrier phase of said ith sample, and wherein the number of bits of which said digital output code is comprised is an integral value approximating the ratio of said data transmission rate to said sampling rate.

20. A method according to claim 19, further including the steps of
(c) controllably combining the digital output code produced in step (b) with at least one additional digital code representative of audio signals; and
(d) transmitting the resultant combined code over said digital communication channel.

21. A method according to claim 20, further comprising the steps of:
(e) receiving the resultant combined code that has been transmitted over said digital communication channel;
(f) controllably separating said digital output code from said resultant combined code; and
(g) decoding the contents of the digital output code separated in step (f) and reconstructing therefrom said bandwidth limited color television signal.

22. A method according to claim 21, wherein step (g) comprises decoding the contents of said digital output code in accordance with said hybrid differential pulse code modulation mechanism to obtain a digital code signal for said ith sample value, filtering said digital code signal through a low-pass digital interpolation filter, and deriving, from the output of said digital interpolation filter, an analog signal representative of the ith sample value of said color television signal.

23. A method according to claim 19, wherein said color television signal comprises an NTSC composite color television signal having a nominal video bandwidth of 4.2 MHz., said prescribed data transmission rate corresponds to 44.736 Mb/s and wherein said digital output code comprises a five bit digital output code and said quantizer/filtering mechanism includes a passband filter having a passband frequency on the order of 4.0 MHz.

24. A method according to claim 23, wherein said previous jth sample corresponds to a sample occurring in the second previous line of the same field of said color television signal.

25. A method according to claim 19, wherein said hybrid differential pulse code modulation mechanism sums the digital code value associated with a previous jth sample of said color television signal with the difference between the digital code value associated with said previous jth sample and the digital code value of an ith sample of said color television signal to produce said digital output code value for said ith sample.

26. A method according to claim 19, wherein step (a) comprises quantizing said color television signal at a sampling rate that effectively corresponds to four times the bandwidth of said color television signal and at a rate producing a spatially fixed sampling pattern and generating digital code signals representative thereof, and filtering said generated digital code signals by means of a decimation filter having a passband frequency less than the bandwidth of said color television signal, and coupling alternate filtered digital code signals to said hybrid differential pulse code modulation mechanism.

* * * * *